US011012528B2

(12) United States Patent
Shankar et al.

(10) Patent No.: US 11,012,528 B2
(45) Date of Patent: May 18, 2021

(54) LOCATING NETWORK SERVERS USING MEDIA ACCESS CONTROL (MAC) ADDRESSES

(71) Applicant: SLING MEDIA PVT LTD, Bangaluru (IN)

(72) Inventors: Shruthi Shankar, Bengaluru (IN); Vikas Yelagonda, Bengaluru (IN)

(73) Assignee: SLING MEDIA PVT LTD, Bangaluru (IN)

( * ) Notice: Subject to any disclaimer, the term of this patent is extended or adjusted under 35 U.S.C. 154(b) by 96 days.

(21) Appl. No.: 16/024,711

(22) Filed: Jun. 29, 2018

(65) Prior Publication Data
US 2020/0007648 A1  Jan. 2, 2020

(51) Int. Cl.
| | |
|---|---|
| G06F 15/16 | (2006.01) |
| H04L 29/08 | (2006.01) |
| H04L 29/12 | (2006.01) |
| H04L 12/46 | (2006.01) |
| H04L 29/06 | (2006.01) |
| H04W 12/06 | (2021.01) |

(52) U.S. Cl.
CPC .............. *H04L 67/32* (2013.01); *H04L 12/46* (2013.01); *H04L 61/6022* (2013.01); *H04L 67/42* (2013.01); *H04L 63/0884* (2013.01); *H04W 12/06* (2013.01)

(58) Field of Classification Search
CPC ..... H04L 67/32; H04L 61/6022; H04L 12/46; H04L 67/42; H04L 63/0884; H04W 12/06
See application file for complete search history.

(56) References Cited

U.S. PATENT DOCUMENTS

| | | | | |
|---|---|---|---|---|
| 2006/0168264 | A1* | 7/2006 | Baba | H04L 12/2809 709/230 |
| 2006/0240770 | A1* | 10/2006 | Shima | H04L 12/2805 455/39 |
| 2009/0064266 | A1* | 3/2009 | Wollmershauser | H04N 21/2541 725/134 |
| 2011/0113455 | A1* | 5/2011 | Wu | H04L 12/2801 725/82 |
| 2014/0075488 | A1* | 3/2014 | Christudass | H04L 41/5058 725/114 |
| 2014/0108650 | A1* | 4/2014 | Asnis | H04L 67/1008 709/224 |
| 2016/0219575 | A1* | 7/2016 | Park | H04W 4/80 |
| 2017/0085651 | A1* | 3/2017 | Harrison | G06F 21/53 |
| 2017/0201883 | A1* | 7/2017 | Zhou | H04W 12/08 |

* cited by examiner

*Primary Examiner* — Cheikh T Ndiaye
(74) *Attorney, Agent, or Firm* — Lorenz & Kopf, LLP

(57) ABSTRACT

Various systems, device and automated processes allow video streaming hosts or other server devices to submit their media access control (MAC) addresses to a backend address server operating on a wide area network (WAN) such as the Internet. Client devices attempting to subsequently contact the server device can contact the address to obtain the MAC address of the target server, thereby allowing the client device to locate and contact the server device using the obtained MAC address.

14 Claims, 2 Drawing Sheets

LOCATING NETWORK SERVERS USING MEDIA ACCESS CONTROL (MAC) ADDRESSES

TECHNICAL FIELD

Figure 1:
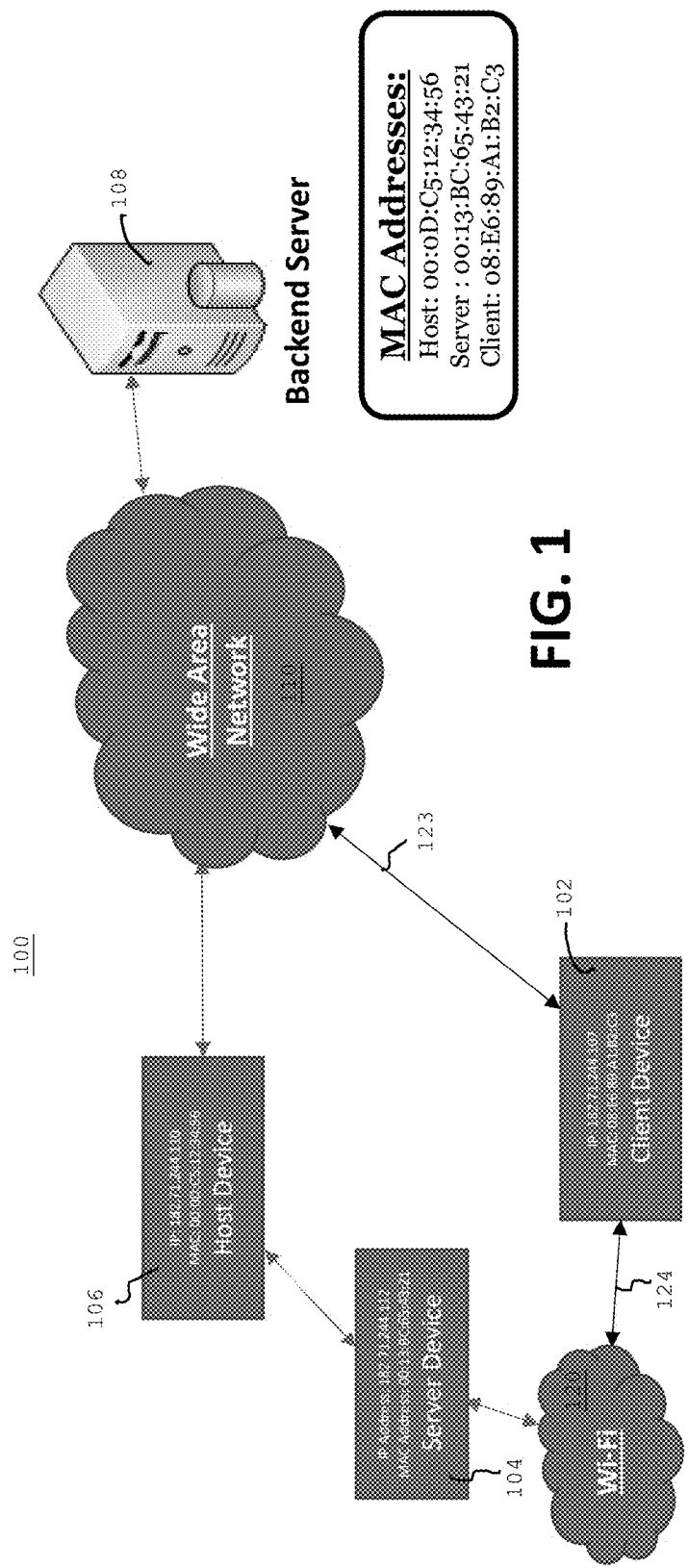

The following discussion generally relates to digital data communications, particularly to location of server devices on data communications networks.

BACKGROUND

Network communication continues to affect almost every aspect of modern life. In the home environment, for example, it is now commonplace for home appliances, security systems, entertainment devices, lights, thermostats, locks and many other devices to inter-communicate with each other and/or with network services on the Internet. Such devices are also commonplace in offices, factories, restaurants and other locations. Moreover, many people now carry portable computing devices such as mobile phones, tablets, etc. as they carry on their data (including video and other media) at home, work, travel and other places.

Often, it can be a substantial challenge to establish communications between devices even within a home or office environment. To provide just one example, media storage devices can be connected to a network either directly or through a host device to provide interaction with one or more client devices (e.g., mobile phones, tablets, computers or the like). A user may wish to direct a media storage device to store or retain a particular television program, for example, for later viewing. Finding the media storage device on a network, however, can be a substantial challenge, especially when the client device has not connected to the media storage device previously.

It is therefore desirable to create devices, systems and processes to improve network location and communication between devices operating within a home or other environment. Other desirable features and characteristics will become apparent from the subsequent detailed description and the appended claims, taken in conjunction with the accompanying drawings and this background section.

BRIEF SUMMARY

Various systems, device and automated processes allow video streaming hosts or other server devices to submit their media access control (MAC) addresses to a backend address server operating on a wide area network (WAN) such as the Internet. Client devices attempting to subsequently contact the server device can contact the backend server to obtain the MAC address of the target server, thereby allowing the client device to locate and contact the server device using the obtained MAC address on other networks.

Various embodiments provide an automated process executed by a processor of a client device to establish a connection with a server device. The automated process suitably comprises: initially authenticating the client device with a backend server via a wide area network; upon successfully authenticating with the backend server, receiving a media access control (MAC) address of the server device from the backend server via the wide area network and storing the received MAC address of the server device on the client device; after receiving the MAC address of the server device, the client device connecting to a second network that is separate from the wide area network; identifying, by the client device, the previously-stored MAC address of the server operating on the second network; and connecting to the server device via the second network using the previously-stored MAC address of the server device. The second network may be, in some embodiments, a wireless network hosted by the server device to facilitate streaming of media content that is stored on the server device to the client device. Equivalent embodiments may perform different functions or operate in any other manner, as desired.

Other embodiments provide an automated process executed by a processor of a backend computer system that communicates via a digital network such as the Internet. The automated process suitably comprises: receiving, by the backend computer system, a media access control (MAC) address associated with a server device; storing the received MAC address associated with the server device in a database; subsequently receiving a request from a client device; and in response to the request, retrieving the MAC address associated with the server device from the database and delivering the retrieved MAC address associated with the server device to the client device to thereby permit the client device to store the MAC address associated with the server device locally and thereby recognize the server device on a second network that is separate from the digital network.

Other embodiments provide a portable digital video recorder or other server device that hosts a local or personal area network for communicating with one or more computers, phones, tablets or other client devices. The server device suitably comprises: a first data interface to a host device that communicates via a wide area network; a second data interface having a MAC address, wherein the second data interface is configured to host a second network that is separate from the wide area network; and a processor configured to initially provide the MAC address of the second data interface to the host device via the first data interface to thereby transmit the MAC address of the second data interface to a backend server on the wide area network, and wherein the processor is further configured to receive a request for a connection from a client device via the second data interface using the MAC address and to establish a connection to the client device via the second network, wherein the client device obtains the MAC address of the second network interface from the backend server via the wide area network.

Still other embodiments may relate to: automatic processes executable by one or more computer-implemented clients, servers and backend services that are substantially as described herein; client or server devices or systems configured to perform any of the processes described herein under the control of programmed hardware; systems of processing devices each configured to interact with each other over one or more networks in any manner that is substantially as described herein; and/or any other systems, devices and/or automated processes substantially as contemplated herein.

These and other examples are set forth in additional detail below.

BRIEF DESCRIPTION OF THE DRAWING FIGURES

Figure 2:
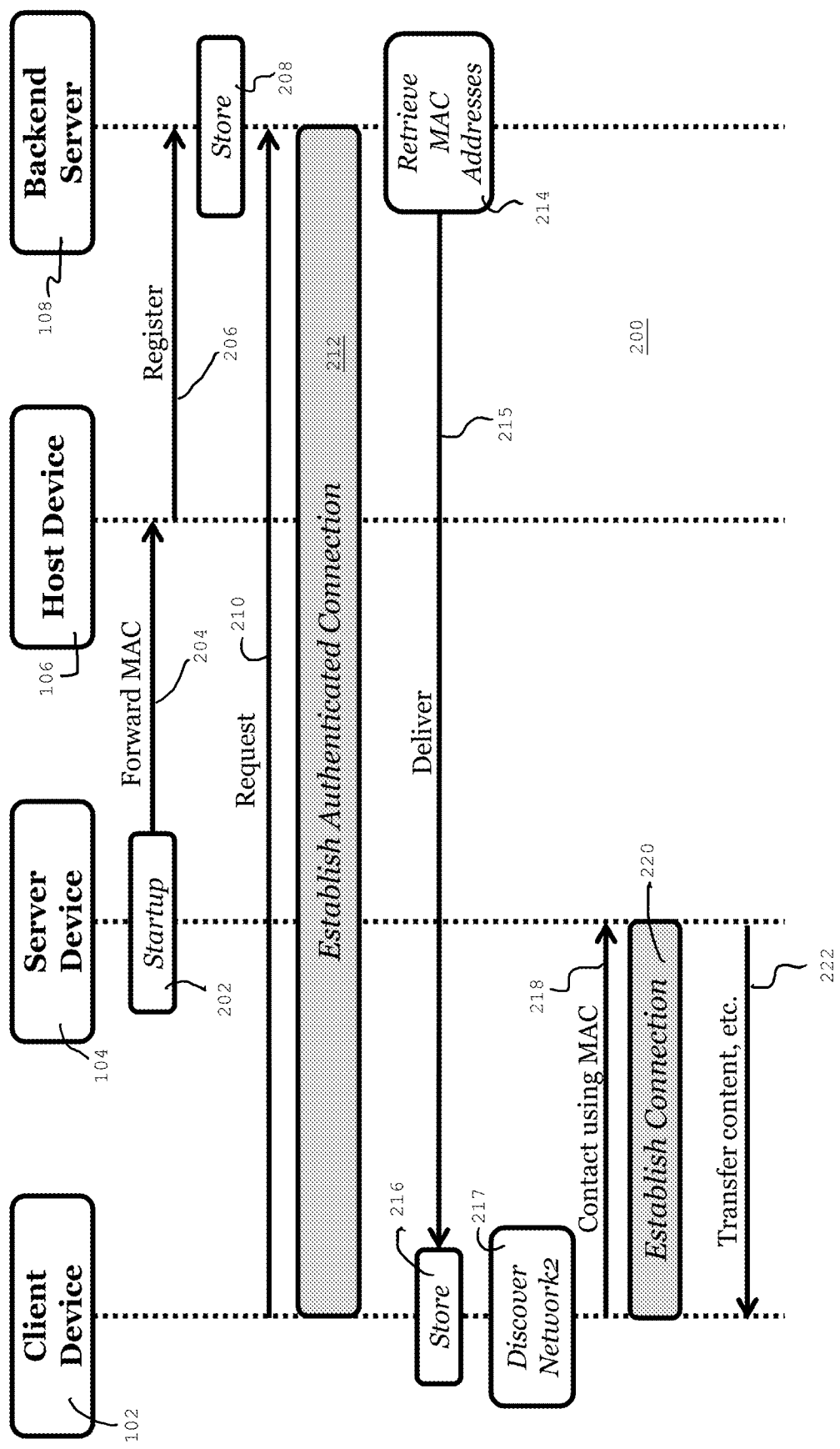

Exemplary embodiments will hereinafter be described in conjunction with the following drawing figures, wherein like numerals denote like elements, and:

FIG. 1 is a diagram of an example system for locating and connecting client and second devices using backend storage of MAC addresses; and FIG. 2 is a diagram showing various computer-implemented actions that occur in an example process 200 to establish a connection between a client device and a second device.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a server device operating within a home, office or similar network environment initially contacts a backend-type server residing on the Internet or another wide area network (WAN) to register its unique media access control (MAC) address. The backend server stores MAC addresses of various server devices in a database so that the MAC addresses can be associated with accounts of system users. When a user later requests authorization for the account using a client device, the backend server is able to retrieve the MAC address of the server from the database and provide it to a client application operated by the authenticated user. The client device can then seamlessly use the received MAC address to connect to identified server devices, even if the connection is established via a different network. By providing a mechanism by which local addresses can be delivered, problems previously associated with locating services on the local area network can be overcome, thereby greatly improving device discovery and connect-ability within the local network environment.

Media access control (MAC) addresses are unique identifiers that are assigned to particular hardware devices (e.g., computers, tablets, phones or the like), or to components of those devices (e.g., network interface cards (NICs)). In most cases, the MAC address is a forty-eight bit digital value that is often represented by a series of twelve hexadecimal values (e.g.: 1A:2B:3C:4D:5E:6F). The first twenty-four bits of the address typically identify a manufacturer of the device, with the last twenty-four bits representing a value that is unique to the particular device. That is, each device operating on a network is designed to have its own unique MAC address that is burned into read-only memory (ROM), or at least firmware to discourage tampering or changing of the address after the device is manufactured. MAC addresses are also referred to as "hardware addresses", "ETHERNET addresses", "burned in addresses", "physical addresses" or the like in some contexts.

The concepts set forth herein may be particularly useful in locating networked media storage devices, such as the HOPPER GO device available from Dish Network of Englewood, Colo., on local or personal area networks. Such devices are typically network-enabled storage devices that interface with a host to securely transfer and store media content (e.g., recorded television programs) for later streaming to a mobile phone, tablet or other client device via a separate network (e.g., a wireless network hosted by the server device that may not be connected to the Internet or a similar WAN). U.S. Pat. No. 9,307,289 is incorporated by reference as one example of a networked personal video recorder (PVR) that interfaces with a host to provide portable access to stored video content via a separate wireless network. Many alternate but equivalent embodiments could be used with any other network devices, servers, hosts and/or clients other that the specific examples referenced herein.

With reference now to FIG. 1, an example data communications system 100 suitably includes a client device 102 that wishes to obtain video streams, files or other content from a server device 104. The client device 102 suitably obtains a MAC address that is associated with the server device 104 from a backend server 108 that is accessible via the internet or another wide area network 110. After the client device 102 learns the MAC address of the relevant server device 104, the address can be recognized on other networks 120, such as a wireless network that is hosted by the server device 104. The client device 102 can then use the MAC address to contact the server device 104 via the second network to receiving video streaming, file sharing, printing, message exchange, gaming and/or any number of other services.

Generally speaking, server 108 is implemented as a network server system using conventional processors, memory, interfaces and other computing hardware under the control of an appropriate operating system and application software. Equivalently, server 108 may be implemented using any sort of "cloud-based" hardware, such as the Amazon Web Services product available from Amazon.com, or any other cloud service such as Microsoft Azure, Google Cloud Platform, Adobe Cloud, VMware, IBM Cloud, Rackspace, Red Hat and/or the like.

Both client 102 and server 104 are typically implemented using conventional data processing hardware, software, firmware, etc. In various embodiments, server 104 may be a networked digital video recorder (DVR), media player, video game player or other network appliance that provides video streams, files or other data to one or more client devices 102. To that end, server 104 may be implemented with conventional processors, memory or mass storage, network interfaces and other computing hardware as appropriate.

Similarly, client device 102 may be implemented with any sort of mobile phone, tablet, personal computer, streaming media client, web browser device or the like. Client device 102 will typically include conventional processor, memory and interface hardware as well as appropriate operating systems and application software as desired. In various embodiments, client device 102 executes a client application that performs the various functions described herein. The client application will typically be implemented with computer-executable instructions that are stored in memory or other digital storage for execution by a processor, as appropriate. Client applications are typically received and installed on the client device 102 using secure mechanisms to ensure the integrity of the application, and to prevent tampering with secure mechanisms used to authenticate the user or the device, and/or to prevent tampering with the application that could allow unpermitted access to copyrighted or otherwise protected media content. The client application will generally be compatible with one or more digital rights management services to allow the device 102 to receive and securely process media content.

To continue the network PVR example described above, server device 104 may be initially placed in communication with a host device 106 (e.g., a set top box, computer system or other computing device) that allows device 104 to communication via the wide area network 110. Equivalently, the host 106 may handle WAN communications on behalf of the server device. In one example, the server device 104 is connected to a computing host 106 via a universal serial bus (USB), high definition media interface (HDMI) or similar cable connection to facilitate relatively high speed data transfer between the host and the server device 104. In the case of the HOPPER GO product, for example, the server device 104 may be plugged in to a HOPPER-type set top box or other media receiver device to receive recorded and/or transcoded media content, such as television programming, movies and/or the like. Other embodiments could interface with other types of host devices 106. Equivalently, the server device 104 could simply include its own interface that allows direct data communication with backend server 108 without the need for a separate host 106. In such embodiments, the host device 104 may use a single network interface (e.g., an IEEE 802.3 or IEEE 802.11 interface) for initially communicating on network 110 and subsequent communication on a hosted network 120, thereby allowing the same MAC address to be used in both communications (albeit on separate networks). Other embodiments of server device 104 could use separate interfaces for communication on networks 110 and 120, as desired.

Media content or other data may be stored on the server device 104 for subsequent retrieval and viewing by a user of a phone, tablet or other client device 102. In some implementations, server device 104 receives recorded and/or transcoded media content from host device 106 via a wired or wireless connection. After the content is transferred, server device 104 is able to be removed from host device 106 for travelling or other portable access to the stored content even when network 110 is not available. That is, server 104 may provide video streams of the stored content to the client device 102 via its own IEEE 802.11, IEEE 802.14 or other network.

As noted above, client device 102 is any sort of computer, smart phone, tablet, personal digital assistant, video game player, media player or other device capable of interfacing with server 102 to receive media streams or other data. Generally speaking, client device 102 is able to communicate over the Internet or a similar WAN 110 using any appropriate cellular, Wi-fi, Bluetooth or similar interfaces. To that end, client device 102 allows the user to contact backend server 108 using a web browser, application or the like via data connection 123. Connection 123 may be, for example, a TCP or UDP connection established over WAN 110 via a LAN connection to a broadband router or the like, via a cellular connection, or via any other network path. In some implementations, connection 123 is established through a home-type LAN environment in which the host device 106 also resides, although this is not necessary in all embodiments.

The client device 102 authenticates with backend server 108 and receives MAC addresses of those server devices 104 that are associated with the authenticated account. The authentication and delivery of MAC addresses occurs via connection 123 over WAN 110, as appropriate. MAC addresses of servers 104 that are associated with the authenticated user can be stored on the client device 102 (e.g., in disk or solid state storage) for subsequent use in contacting server device 104 via different networks and/or network connections.

In various embodiments, server device 104 provides a Wi-Fi (IEEE 802.11) or similar local area network (LAN) or personal area network (PAN) service 120 that client device 102 can use to establish streaming media or other data connections 124 with the server device. Equivalent embodiments could make use of a separate network 120 that is hosted by a separate access point other than server 104, if desired. But since the MAC address of the server device 104 is essentially fixed, the MAC address can be used to reliably identify the server 104 even when the server 104 is operating on a different network 120 than the network 110 that is initially used to register, authenticate and obtain connection data. Put another way, MAC addresses can be delivered to the client device 102 via a first data connection 123 via a first network 110 to allow the client device 102 to later contact the server device 104 via a second data connection 124 over a second network 120, wherein the first and second data connections are separate from each other, and wherein the first and second networks are separate data networks. In various embodiments, connection 123 is a TCP or UDP connection to backend server 108 that is established over a WAN 110, and connection 124 is a physical or MAC layer connection (e.g., an IEEE 802.11 connection) established over a LAN or PAN 120, although equivalent embodiments could be formulated to use any number of different protocols and communications formats, including any sort of proprietary or customized formats.

Application software executing within client device 102 may, in some instances, include a WIFI or similar plugin for MAC-layer protocols that is included as a library or the like. Typically, routines included within this library can be used to fetch the network addresses of devices operating on the various networks 120 available to client device 102. The client device 102 suitably scans the list of available MAC addresses to compare the available addresses to the previously-received MAC addresses of registered server devices 104. If a MAC address of a server device 104 is recognized, then the client device 102 can contact the server 104 and establish a connection using, e.g., the network plugin/library referenced above. If no MAC addresses are recognized, the user of the client device 102 may be notified that no server 104 is available, or other actions may be taken as desired. Recognized servers 104 may be automatically established by the application or a user of the client device 102 may be prompted to approve the connection, if desired.

FIG. 2 shows an example process 200 that is executed between client device 102, server device 104, host device 106 and backend server 108 in an example embodiment. The various functions shown in FIG. 2 may be performed in any manner, such as by programmed logic (e.g., software or firmware) stored and executed by processing circuitry in the relevant device 102, 104, 106, 108. The various functions shown in FIG. 2 may be modified in any manner, and various functions may be combined and/or executed in any other temporal manner, as desired.

Server device 104 suitably registers its MAC address with backend server 108 in any suitable manner. In the example of FIG. 2, the server device 104 initiates registration upon initial startup of the device (function 202). Startup may represent a first power-on of the device 104, a first connection of the server device 104 to a host device 106, and/or the like. In various embodiments, server device 104 provides its MAC address(es) to the host device 106 (function 204) upon first connection, and host 106 forwards the received address to the backend server 108 (function 206) for storage in a database (function 208). The database maintained by backend server 108 may be (or at least be associated with) an account database that stored user account information and that is used to authenticate approved users of system 100. Information about subscribers to a cable, direct broadcast satellite (DBS) or other television provider, for example, may be stored in the database, along with information about the particular hardware devices (e.g., server device 104, host device 106) that are operated by each particular subscriber.

When a subscriber wishes to use a particular service, the client device 102 operated by the subscriber contacts the backend server 108 (function 210) to request access. In various embodiments, the subscriber is authenticated to verify the identity of the subscriber and/or to authorize access to the requested service. Authorization/authentication may take place using userid/password combinations, biometric data, stored secrets (e.g., cookies) that were previously established between client device 102 and backend server 108, and/or any other techniques. Various embodiments may make use of OAuth or similar network validation services, as desired. Authentication may be tied to the identity of the user and/or to the identity of the client device 102, as desired, and any number of personal or device authorization techniques or systems could be used.

When the user/device is approved, an authenticated connection 123 is established between the client device 102 and the backend server 108 (function 212). As noted above, connection 123 is typically a secure TCP, UDP or similar connection that is established over WAN 110 to provide secure transport of access credentials, addresses or other information to the application executing on client device 102. As noted above, MAC addresses of any server devices 104 that are associated with the authenticated user can be retrieved from the database (function 214) and transmitted to the client device 102 via the connection 123 (function 215). The client device 102 stores the received MAC addresses in memory or other storage (function 216) for subsequent use in contacting one or more server devices 104.

After the client device 102 receives and stores the MAC addresses of the server devices 104 associated with its account, the client device 102 is able to use the previously-stored addresses to recognize the server device 104 regardless of the network 120 used to connect. If the server device 104 is unplugged (or otherwise disconnected) from host device 106 and transported to another location, for example, the client device 102 can nevertheless recognize the server device 104 even though the device 104 is operating on a different network 120. Various embodiments of the server device 104 (e.g., the HOPPER GO device previously described) include a wired or wireless access point that hosts a LAN or PAN that can be used to connect to client devices 102 to serve streaming or other media content even when WAN 110 is not available or otherwise convenient (e.g., while travelling in a car or plane, in remote locations, in hotels or other remote locations, etc.).

To that end, client device 102 subsequently contacts server device 104 by discovering one or more available wireless (or other) LAN, PAN or similar networks (function 217). The client device 102 suitably identifies devices that are operating on one or more networks 120, and attempts to recognize one or more MAC addresses from the identified devices. If a MAC address is recognized, the client device 102 contacts the server device 104 at the recognized MAC address (function 218) to establish connection 124 (function 220). After connecting to the server device 104 via the second network 120, client 102 and server 104 can interact to deliver streaming media, to serve video game content, to exchange messages, or otherwise transfer data as desired (function 222).

The general concepts set forth herein may be modified in any number of different ways. A priori MAC address delivery could be expanded, for example, so that the server device 104 receives MAC address information about the client device 102 via backend server 108, if desired. Client MAC information could be submitted upon the establishment of an authenticated connection with the backend server 108, for example, and the client MAC address could be securely delivered to the server device 104 (e.g., via network 110 and/or host 106) for storage on the device. When the server device 104 subsequently recognizes the MAC address of a client device 102 operating on a different LAN or PAN 120, the server 104 could initiate contact, if desired. In still further embodiments, MAC addresses of both clients 102 and servers 104 could be stored in backend server 108 and exchanged as desired to allow both clients 102 and servers 104 to locate each other on second networks 120, if desired.

Although the network environment is often described herein as a "home" environment, equivalent concepts could be applied to offices, schools, factories, restaurants and bars, and/or any number of other environments that make use of multiple local area networks. Moreover, the concepts described herein with respect to contacting DVR or PVR video storage devices to establish video streaming could be equivalently applied for other applications or purposes, such as internet television (IPTV), video gaming, home or office control, file or print sharing and/or any other applications as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a processor of a client device to establish a connection with a server device, the automated process comprising:
   initially authenticating the client device with a backend server via a wide area network;
   upon successfully authenticating with the backend server, receiving a media access control (MAC) address of the server device from the backend server via the wide area network and storing the received MAC address of the server device by the client device;
   after receiving the MAC address of the server device, the client device disconnecting from the wide area network and connecting to a second network that is separate from the wide area network, wherein the second network is a local area network that is hosted by the server device having no access to the wide area network;
   identifying, by the client device, the previously-stored MAC address of the server operating on the second network without communicating on the wide area network; and
   directly connecting to the server device via the second network using the previously-stored MAC address of the server device when the wide area network is not available.

2. The automated process of claim 1 wherein the MAC address of the server is forwarded to the backend server by a host device that physically and electrically interfaces with the server device.

3. The automated process of claim 2 wherein the server device communicates on the wide area network via the host device.

4. The automated process of claim 3 wherein the server device is a portable digital video recorder device that receives content from the host device and that provides video streams of the received content to the client device via the second network.

5. The automated process of claim 1 wherein the client device recognizes the server device on the local area network hosted by the server device by the previously-stored MAC address of the server device.

6. The automated process executed by a processor of a backend computer system that communicates via a digital network, the automated process comprising:
  receiving, by the backend computer system, a media access control (MAC) address associated with a server device;
  storing the received MAC address associated with the server device in a database;
  subsequently receiving a request from a client device via the digital network; and
  in response to the request, retrieving the MAC address associated with the server device from the database and delivering the retrieved MAC address associated with the server device to the client device to thereby permit the client device to store the MAC address associated with the server device locally and thereby subsequently recognize the server device and to directly connect to the server device using the MAC address associated with the server device at a later time via a second network that is separate from the digital network when the digital network is not available to the client device, wherein the second network is a local area network that is hosted by the server device.

7. The automated process of claim 6 wherein further comprising authenticating the client device in response to the request.

8. The automated process of claim 7 wherein the client device and the server device are both associated with a common account in the database.

9. The automated process of claim 6 wherein the MAC address associated with the server device is received via a host device that physically and electrically interfaces with the server device to thereby permit the server device to communicate via the digital network.

10. The automated process of claim 9 wherein the server device is a portable digital video recorder device that receives content from the host device and that provides video streams of the received content to the client device via the second network.

11. The automated process of claim 10 wherein the client device recognizes the server device on the second network by the MAC address.

12. A server device comprising:
  a first data interface to a host device that communicates via a wide area network;
  a second data interface having a MAC address, wherein the second data interface is configured to host a second network that is a local area network that is separate from and has no access to the wide area network; and
  a processor configured to initially provide the MAC address of the second data interface to the host device via the first data interface to thereby transmit the MAC address of the second data interface to a backend server on the wide area network, and wherein the processor is further configured to subsequently receive a request for a connection directly from a client device via the second data interface using the MAC address and to establish a direct connection to the client device via the local area network that is separate from the wide area network, wherein the client device obtains the MAC address of the second network interface from the backend server via the wide area network and stores the MAC address of the second network interface prior to transmitting the request to thereby establish a subsequent direct connection to the server device via the local area network hosted by the server device when the wide area network is not available.

13. The server device of claim 12 wherein the first data interface is a serial interface to the host device, and wherein the second data interface is a wireless data network interface.

14. The server device of claim 13 wherein the first data interface is a uniform serial bus (USB) interface, and wherein the second data interface is an IEEE 802.11 (WIFI) interface.

* * * * *